(12) United States Patent
Cheng et al.

(10) Patent No.: US 8,991,471 B2
(45) Date of Patent: Mar. 31, 2015

(54) METHODS OF FORMING EARTH-BORING TOOLS

(75) Inventors: Xiaomin Chris Cheng, Houston, TX (US); Eric C. Sullivan, Houston, TX (US); Tu Tien Trinh, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 200 days.

(21) Appl. No.: 13/314,960

(22) Filed: Dec. 8, 2011

(65) Prior Publication Data

US 2013/0146366 A1 Jun. 13, 2013

(51) Int. Cl.
| | |
|---|---|
| *B22D 13/00* | (2006.01) |
| *B22D 19/16* | (2006.01) |
| *B22D 25/02* | (2006.01) |
| *C21D 6/00* | (2006.01) |
| *C21D 9/22* | (2006.01) |
| *C22C 38/10* | (2006.01) |
| *C22C 38/12* | (2006.01) |
| *E21B 10/00* | (2006.01) |
| *E21B 10/36* | (2006.01) |

(52) U.S. Cl.
CPC .............. *B22D 13/00* (2013.01); *B22D 19/16* (2013.01); *B22D 25/02* (2013.01); *C21D 6/001* (2013.01); *C21D 9/22* (2013.01); *C21D 2211/004* (2013.01); *C21D 2211/008* (2013.01); *C22C 38/105* (2013.01); *C22C 38/12* (2013.01); *E21B 10/00* (2013.01); *E21B 10/36* (2013.01)
USPC ............ 164/69.1; 164/76.1; 164/94; 164/114

(58) Field of Classification Search
USPC .................................. 164/114, 94, 69.1, 76.1
See application file for complete search history.

(56) References Cited

U.S. PATENT DOCUMENTS

| | | | | |
|---|---|---|---|---|
| 4,377,196 | A * | 3/1983 | Khandros | 164/66.1 |
| 4,572,278 | A * | 2/1986 | Sundberg | 164/457 |
| 4,667,543 | A * | 5/1987 | Tsugaki et al. | 76/108.2 |
| 5,025,849 | A * | 6/1991 | Karmarkar et al. | 164/97 |
| 5,603,783 | A * | 2/1997 | Ferreira | 148/549 |
| 6,634,413 | B2 * | 10/2003 | Ray et al. | 164/114 |
| 6,986,381 | B2 * | 1/2006 | Ray et al. | 164/529 |
| 8,087,324 | B2 * | 1/2012 | Eason et al. | 76/108.2 |
| 2009/0008154 | A1 | 1/2009 | El Hakam et al. | |
| 2011/0287238 | A1 | 11/2011 | Stevens et al. | |

OTHER PUBLICATIONS

Royer et al., Spun Steel Pipes for the Offshore Industry, Offshore Technology Conference, May 4-7, 1981.

(Continued)

*Primary Examiner* — Kevin P Kerns
(74) *Attorney, Agent, or Firm* — TraskBritt (57) ABSTRACT

A method of forming an earth-boring tool includes introducing metal into a die, rotating the die to generate centrifugal forces on the metal, and cooling the metal in the rotating die. A rotary drill bit may include a unitary, centrifugally cast bit body including an integral shank, at least one blade, and at least one cutting element on the blade. A rotary drill bit or a roller cone may include a first centrifugally cast material and a second centrifugally cast material. Another rotary drill bit includes a bit body comprising a maraging steel alloy. A method of forming a rotary drill bit may include disposing cutting elements on a rotary drill bit comprising maraging steel and aging the rotary drill bit to form at least one intermetallic precipitate phase. Methods of repairing a rotary drill bit include annealing and aging at least a portion of a rotary drill bit.

18 Claims, 7 Drawing Sheets

(56) References Cited

OTHER PUBLICATIONS

Schutze et al., Development of an Atlas of Microstructures for the Latest Heat-Resistant Cast Alloys, Nace International Corrosion Conference & Expo, 2007, Mar. 11-15, 2007.

Singh et al., Toughness Considerations for Centrifugally Cast HF—Modified Alloy Piping Used in Hydroprocessing Services, Corrosion 2004, Mar. 28-Apr. 1, 2004.

Trinh et al., U.S. Appl. No. 61/535,627, filed Sep. 16, 2011, and entitled "Methods for Attaching Cutting Elements to Earth-Boring Tools and Resulting Products."

* cited by examiner

METHODS OF FORMING EARTH-BORING TOOLS

FIELD

The present disclosure relates to earth-boring tools and to methods of fabricating earth-boring tools.

BACKGROUND

Earth-boring tools for forming boreholes in subterranean earth formations, such as for hydrocarbon production, carbon dioxide sequestration, etc., generally include a plurality of cutting elements secured to a body. For example, fixed-cutter earth-boring rotary drill bits (also referred to as "drag bits") include cutting elements fixed to a bit body of the drill bit. Similarly, roller-cone earth-boring rotary drill bits may include cones mounted on bearing pins extending from legs of a bit body such that each cone is capable of rotating about the bearing pin on which it is mounted. A plurality of cutting elements may be provided on each cone of such a drill bit.

Bit bodies may be formed of metal-matrix composites having a continuous phase and a dispersed phase. The continuous phase may be a metal or an alloy, such as a copper alloy, steel, cobalt, a cobalt-nickel alloy, etc. The dispersed phase may be a reinforcing material, and may be a different metal or another material, such as a ceramic. The dispersed phase may be selected to impart a particular property to the composite, such as hardness, wear resistance, strength, thermal conductivity, etc. For example, the dispersed phase may include materials such as tungsten carbide, cubic boron nitride, silicon carbide, diamond, etc. The dispersed phase may include, particles, fibers, whiskers, etc.

Metal-matrix composite materials may be formed by various methods. For example, a hard particulate material such as tungsten carbide may be placed within a graphite mold and infiltrated with a binder, such as a copper alloy. Cast resin-coated sand, graphite displacements or, in some instances, tungsten carbide particles in a flexible polymeric binder, may be employed to define topographic features of matrix-type bits. Because a composite material comprising tungsten carbide or other relatively hard particles may be substantially unmachinable, a machinable steel blank is typically disposed within the bit mold prior to infiltration of the hard particulate material, the steel blank forming a portion of the matrix-type rotary drag bit body upon hardening of the infiltrant that affixes the blank therein. In a manner similar to fabrication of steel body drill bits, the matrix-type bit body, via the machinable blank, may be secured to a hardened steel shank having a threaded pin connection for securing the bit to the drive shaft of a downhole motor or directly to drill collars at the distal end of a drill string rotated at the surface by a rotary table or top drive.

Bit bodies may also be formed by casting. For example, a solid material may be dispersed within a molten material, and the mixture may be cooled. As the molten material solidifies, it becomes the continuous (matrix) phase of the composite, whereas the solid material is the dispersed phase. In other methods, the material selected to form the matrix phase may be mixed, as a powder, with the material selected to be the dispersed phase. The mixture may be placed into a mold. The mixture may then be bonded by melting and re-solidifying the matrix phase, such as through pressing (e.g., hot isostatic pressing (HIP), uniaxial pressing), sintering, etc.

Conventional metal-matrix composite materials (and thus, bit bodies or tools formed from such materials) may have some desirable mechanical and thermal properties, but may suffer problems such as relatively poor fracture toughness, poor machinability, poor reparability, and/or low dimensional precision.

BRIEF SUMMARY

In some embodiments of the disclosure, a method of forming an earth-boring tool includes introducing a first metal into a die configured to define at least a portion of an earth-boring tool, rotating the die while the first metal is in a molten state within the die to generate centrifugal forces on the molten first metal within the die, and cooling the first metal in the die while the die is rotating and solidifying the first metal from the molten state to form at least a portion of the earth-boring tool.

A rotary drill bit may include a unitary, centrifugally cast bit body including an integral shank and at least one blade, and at least one cutting element disposed on the at least one blade.

Another rotary drill bit of the disclosure includes a bit body comprising a first centrifugally cast material and a second centrifugally cast material. The bit body comprises a shank and at least one blade. At least one cutting element is disposed on the at least one blade.

A roller cone may include a body comprising a first centrifugally cast material and a second centrifugally cast material and at least one cutting element disposed on the body.

Another rotary drill bit may include a bit body and at least one cutting element disposed on the bit body. The bit body comprises a maraging steel alloy including iron, nickel, and an intermetallic precipitate phase.

A method of forming a rotary drill bit may include forming at least a portion of a rotary drill bit comprising a maraging steel alloy including iron, nickel, and at least one of cobalt, molybdenum, and titanium; disposing a plurality of cutting elements on the rotary drill bit; and aging the at least a portion of the rotary drill bit at a temperature of at least 450° C. to form at least one intermetallic precipitate phase in the portion of the rotary drill bit.

A method of repairing a rotary drill bit may include annealing at least a portion of a rotary drill bit and aging the at least a portion of a rotary drill bit at a temperature of at least 450° C. to form at least one intermetallic precipitate phase in the at least a portion of the rotary drill bit. The rotary drill bit may comprise a maraging steel alloy including iron, nickel, and at least one of cobalt, molybdenum, and titanium.

BRIEF DESCRIPTION OF THE DRAWINGS

While the specification concludes with claims particularly pointing out and distinctly claiming what are regarded as embodiments of the present disclosure, various features and advantages of this disclosure may be more readily ascertained from the description of example embodiments set forth below, when read in conjunction with the accompanying drawings, in which:

DETAILED DESCRIPTION

The illustrations presented herein are not actual views of any particular material, drill bit, blade, roller cone, cutting element, or other tool, and are not drawn to scale, but are merely idealized representations employed to describe embodiments of the disclosure. Elements common between figures may retain the same numerical designation.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller-cone bits, hybrid bits, and other drilling bits and tools known in the art.

As used herein, the term "maraging steel" means and includes a low-carbon martensitic steel that is hardenable to include intermetallic precipitates. Maraging steel may include secondary alloying elements, such as cobalt, molybdenum, or titanium, added to produce the intermetallic precipitates. For example, maraging steel may contain from about 15 wt % to about 20 wt % nickel, from about 5 wt % to about 20 wt % cobalt, from about 2 wt % to about 6 wt % molybdenum, and from about 0.1 wt % to about 2.0 wt % titanium. In some embodiments, maraging steel may contain from about 17 wt % to about 19 wt % nickel, from about 8 wt % to about 12 wt % cobalt, from about 3 wt % to about 5 wt % molybdenum, and from about 0.2 wt % to about 1.6 wt % titanium. Due to its low carbon content, maraging steel may be easier to machine than conventional carbon steel. Maraging steel derives strength from the intermetallic precipitates, which may be formed by thermal aging of the material. Because maraging steel does not require quenching, it may undergo very little dimensional change, and may therefore be machined before aging. Furthermore, cracks in bodies formed of maraging steel may be negligible or nonexistent. Maraging steel may be strong and tough, yet malleable.

Components of earth-boring tools, such as bit bodies, roller cones, shanks, blades, etc., may be formed by centrifugal casting processes. A metal selected to form a portion of an earth-boring tool may be disposed within a die or mold. The die or mold may be rotated, and the metal may be cooled to form a portion of the earth-boring tool. Centrifugal casting may improve the homogeneity, accuracy, and/or reliability of the casting process as compared to static casting. Centrifugal forces may direct molten metal into crevices and details of the die or mold. Bodies formed by centrifugal casting may be relatively free from gas and shrinkage porosity. Furthermore, an entire bit body may be cast in one piece, eliminating problems such as shank welding, chamfer defects, etc.

Figure 1:
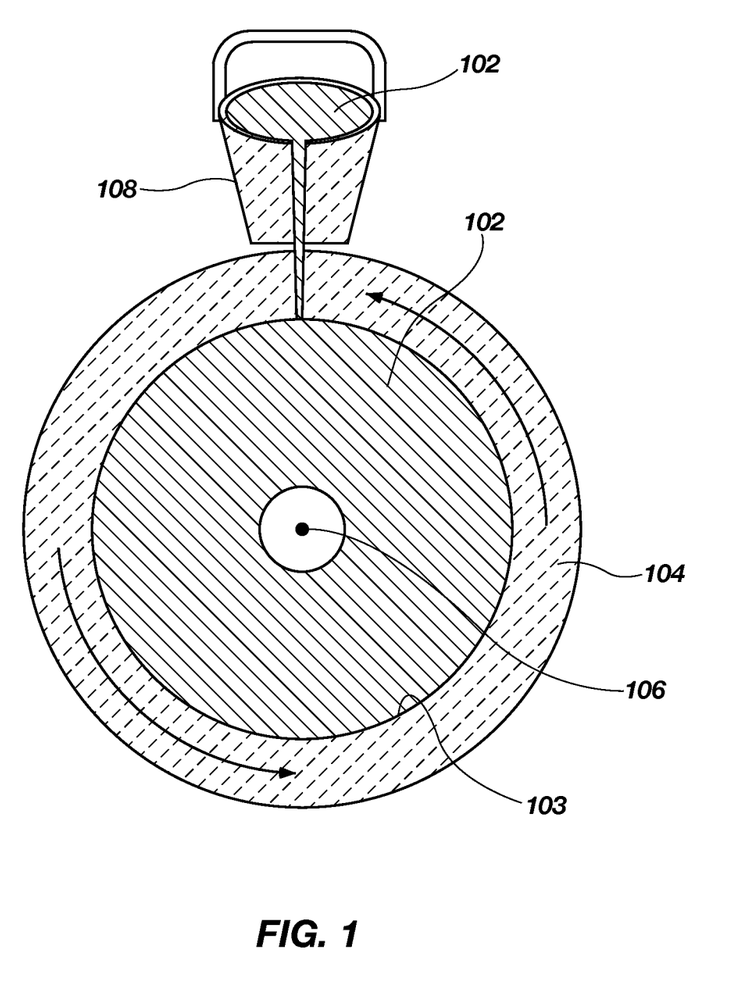
FIG. 1 is a simplified drawing showing how centrifugal casting of earth-boring tools may be performed.

FIG. 1 shows how centrifugal casting may be performed. A metal material 102 may be placed into a cavity 103 within a die 104, and the die 104 may rotate about an axis 106 while the metal material 102 cools and solidifies from a molten state to form a body. The axis 106 is indicated by a center point of the die 104 in FIG. 1. The axis 106 (and therefore the die 104) may have any selected orientation, such as horizontal, vertical, or skew. That is, the die 104 may be rotated about a vertical axis, a horizontal axis, or any other selected axis. The die 104 may be rotated at any selected rotational velocity. The rotational velocity may be selected such that a selected centrifugal force acts on the metal material 102 within the die 104. For example, a centrifugal force acting on the metal material 102 may be from about the force of gravity (1 g) to about 1000 times the force of gravity (1000 g), such as about ten times the force of gravity (10 g) or about one hundred times the force of gravity (100 g).

In some embodiments, the die 104 may be a metal or graphite mold. The cavity 103 may have an interior surface shaped to correspond to at least a portion of an exterior of a drill bit body, a shank, a roller cone, etc. The die 104 may be configured to be secured to a rotor, shaft, or another rotation means. The die 104 may have an opening through which the metal material 102 may be transferred.

The metal material 102 may be supplied to the die 104 in any selected form, such as in solid form, in liquid form, as a mixture of solid and liquid, etc. In some embodiments, the metal material 102 may be heated to a molten state in a vessel 108 (e.g., a crucible) outside the die 104, then transferred to the die 104 as a liquid. For example, as shown in FIG. 1, the metal material 102 may be poured into the die 104. The metal material 102 may be transferred to the die 104 while the die 104 rotates about the axis 106. The metal material 102 may include a metal or an alloy. For example, the metal material 102 may include an alloy of iron, such as a steel alloy. The metal material 102 may optionally include one or more non-metals, such as carbon. In some embodiments, the metal material may comprise a maraging steel. In some embodiments, the metal material 102 may be provided within the die 104 as a solid (e.g., a powder, an ingot, etc.) or as a mixture of solids and liquids (e.g., a suspension). The metal material 102 may be heated within the die 104 to melt one or more components of the metal material 102.

The die 104 may restrain or enclose the metal material 102 as the metal material 102 cools and solidifies. The metal material 102 may cool to form a solid body having an exterior surface adjacent an interior surface of the die 104.

FIGS. 2 through 5 are used to describe various embodiments of methods of the present disclosure. Although the methods are described with reference to formation of a roller cone of a roller cone rotary drill bit, the methods may be used to form any body of an earth-boring tool, including, for example, bit bodies of fixed-cutter earth-boring rotary drill bits.

Figure 2:
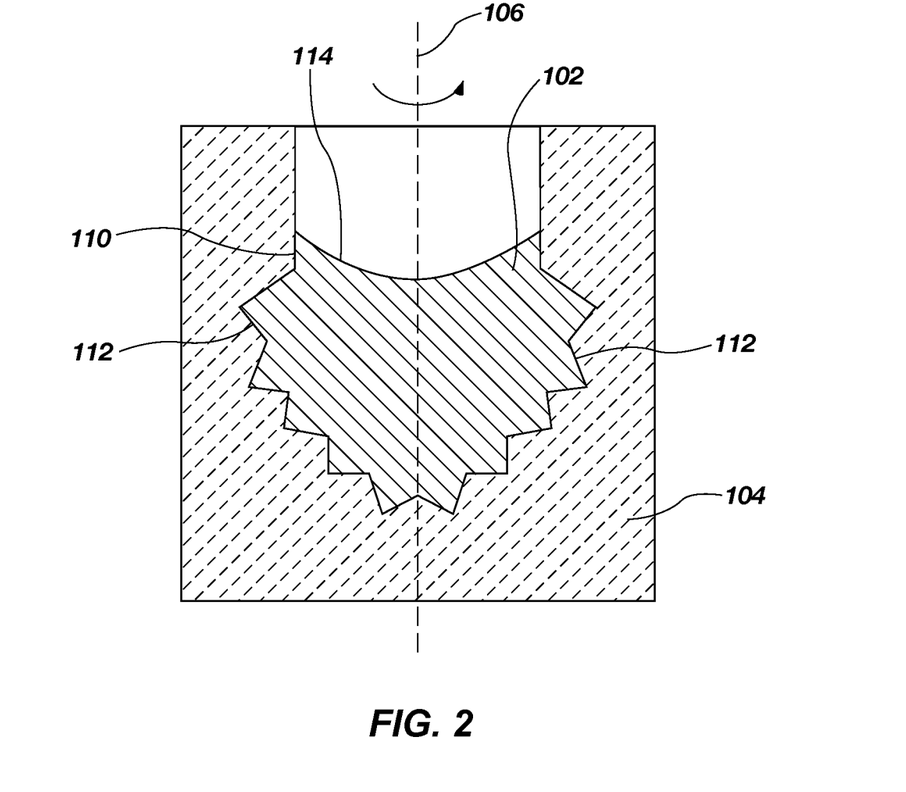
FIGS. 2 through 5 are simplified cross-sections of roller cones that may be formed by the casting processes described herein, at various stages of formation.

FIG. 2 shows a cross-section of a partially formed roller cone 110 that may be formed by the casting processes described herein. The roller cone 110 includes a metal material 102 disposed within a die 104. The die 104 rotates about the axis 106 as the metal material 102 solidifies. The metal material 102 may take the shape of at least a portion of the die 104. In this case, the die 104 may have surfaces shaped to define cutting elements 112 of the roller cone 110. The rotation of the die 104 may cause a surface 114 of the metal material 102 to be nonplanar. For example, as the die 104 rotates about an axis 106 oriented vertically, the surface 114 of the metal material 102 may be higher at the surface of the die 104 than at the axis 106. The curvature of the surface 114 may be a function of the rotational velocity, the geometry of the die 104, and/or the composition of the metal material 102.

Figure 3:
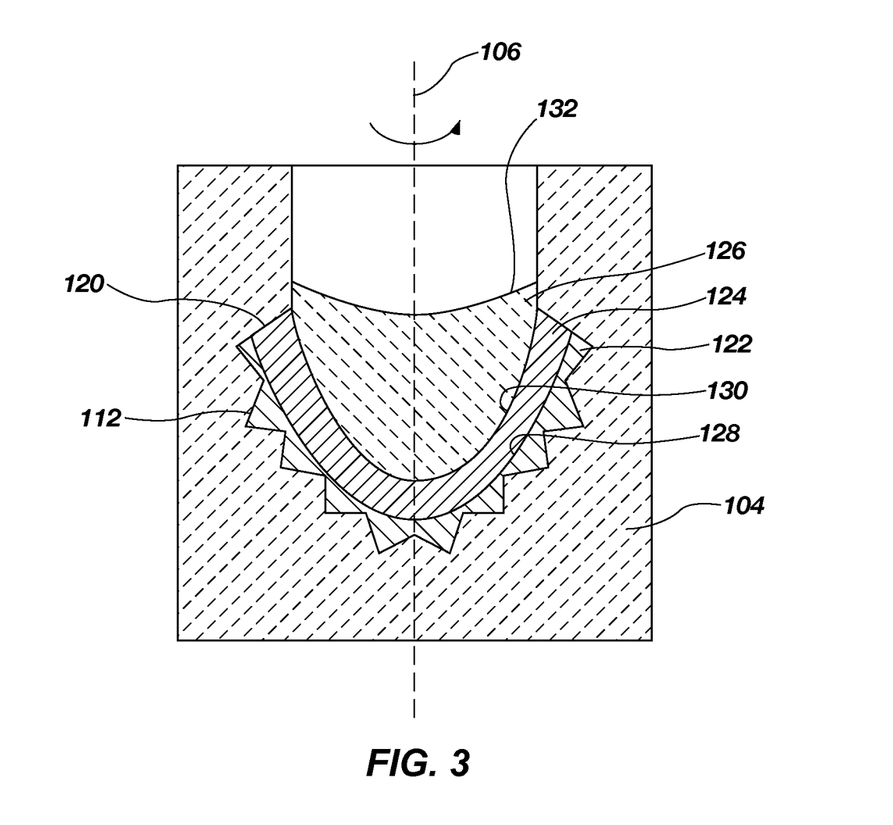

FIG. 3 shows a cross-section of another partially formed roller cone 120 that may be formed by the casting processes described herein. The roller cone 120 includes three metal materials 122, 124, 126 disposed within a die 104, though the roller cone 120 may include any number of metal materials. The first metal material 122 may be disposed at radially outward portions of the roller cone 120, such as by applying the first metal material 122 within the die 104 and solidifying the first metal material 122 while rotating the die 104. The first metal material 122 may fill spaces corresponding to the cutting elements 112 of the roller cone 120. The first metal material 122 may form a first curved surface 128 due to rotation about the axis 106 and/or gravity. Though shown in FIG. 3 as entirely filling the spaces corresponding to the cutting elements 112 and forming a continuous first metal material 122, the first metal material 122 may alternatively be discontinuous. For example, the first metal material 122 may form only tips or points of the cutting elements 112.

A second metal material 124 may be disposed within the die 104 and over the first metal material 122. The second metal material 124 may be disposed within the die 104 before or after the first metal material 122 solidifies. The second metal material 124 may form a second curved surface 130, which may be shaped similarly to the first curved surface 128. In some embodiments, the rotational velocity may be changed during or after addition of the second metal material 124 to change the shape of the second curved surface 130. The thickness of the second metal material 124 may vary across the roller cone 120. For example, if the rotational velocity of the die 104 is relatively high, the second metal material 124 may flow toward the outermost portions of cavity 103 of the die 104.

A third metal material 126 may be disposed within the die 104, as well as over the first metal material 122 and/or the second metal material 124. The third metal material 126 may be disposed within the die 104 before or after the second metal material 124 solidifies. The third metal material 126 may form a third curved surface 132, which may be shaped similarly to the first curved surface 128 and/or the second curved surface 130. In some embodiments, the rotational velocity may be changed during or after addition of the third metal material 126 to change the shape of the third curved surface 132. The thickness of the third metal material 126 may vary across the roller cone 120. For example, if the rotational velocity of the die 104 is relatively high, the third metal material 126 may flow toward the outermost portions of cavity 103 of the die 104.

The metal materials 122, 124, 126 may be simultaneously cooled and solidified, or one metal material 122, 124, 126 may be cooled and solidified before adding the next. Different metal materials 122, 124, 126 may be selected to impart different physical and/or chemical properties to the roller cone 120. For example, the first metal material 122 may be selected for its hardness, the third metal material 126 may be selected for its strength, and the second metal material 124 may be selected for its ability to bond to both the first metal material 122 and the third metal material 126. Dividing the casting process into multiple steps may allow production of a graded structure with a more erosion-resistant outer portion and a tougher core.

Figure 4:
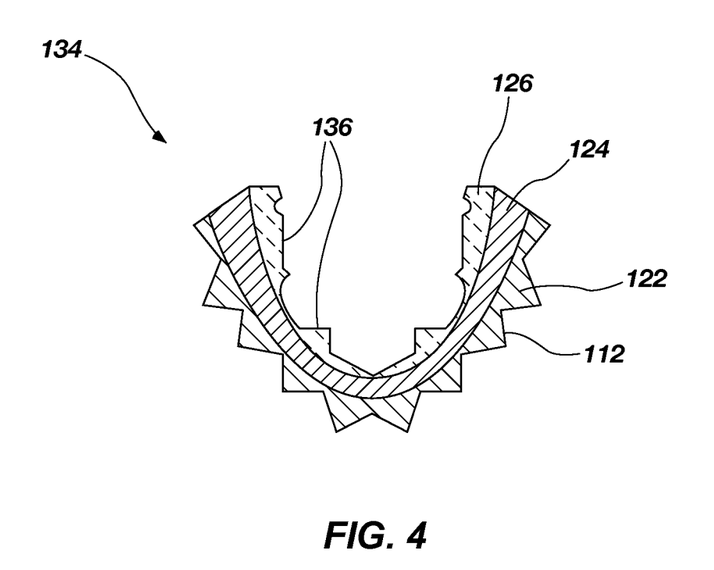

One or more metal materials 122, 124, 126 may be selected such that the article, or a specific portion thereof, may be easily machined. For example, in a roller cone 120 having a third metal material 126 toward the center of the roller cone 120, the third metal material 126 may be a machinable steel. FIG. 4 shows a roller cone 134 that has been removed from the die 104 and machined. A portion of the third metal material 126 of the partially formed roller cone 120, as shown in FIG. 3, has been removed to form surfaces 136 of the roller cone 134, such as bearing surfaces, O-ring surfaces, etc.

Figure 5:
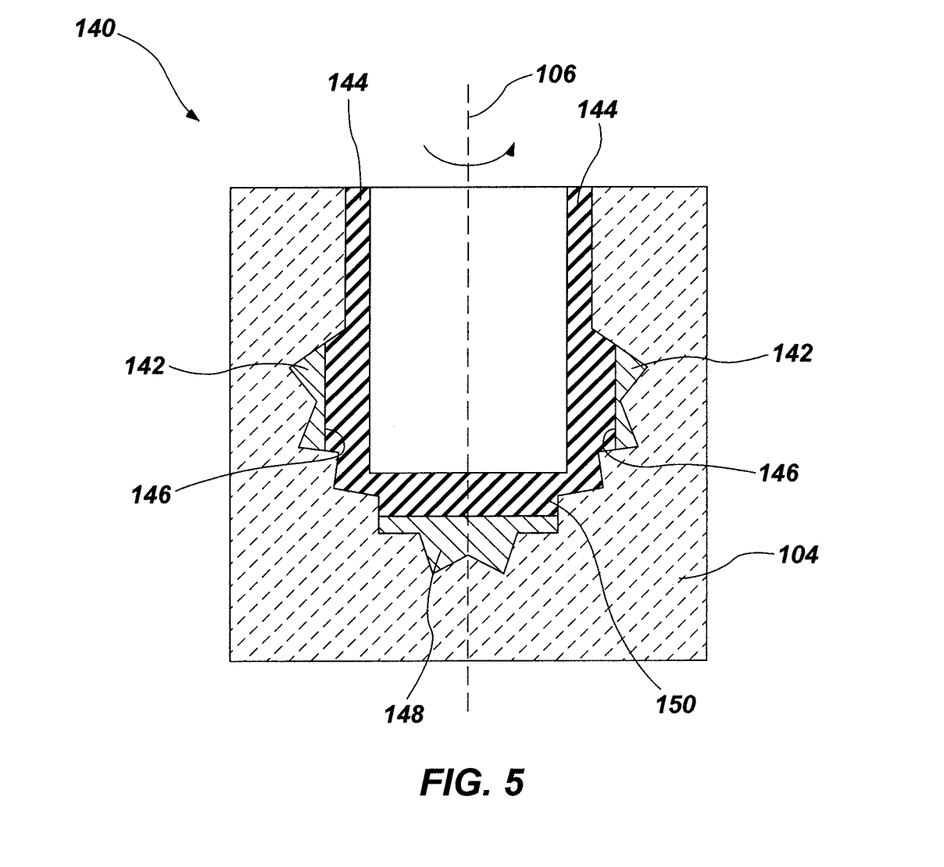

FIG. 5 shows a cross-section of another partially foamed roller cone 140 that may be formed by the casting processes described herein. The roller cone 140 includes two metal materials 142, 144 disposed within a die 104, though the roller cone 140 may include any number of metal materials. The first metal material 142 may be disposed at radially outward portions of the roller cone 140, such as by applying the first metal material 142 within the die 104 and solidifying the first metal material 142 while rotating the die 104. The first metal material 142 may fill spaces corresponding to some cutting elements 112 of the roller cone 140. The first metal material 142 may form a first surface 146 due to rotation about the axis 106. For example, the first surface 146 may be approximately cylindrical. The centrifugal force on the first metal material 142 may be strong enough that gravity does not significantly affect the shape of the first surface 146. In some embodiments, the axis 106 may be horizontal, such that the effect of gravity on the shape of the first surface 146 may be avoided with a relatively lower rotational velocity. The second metal material 144 may be cast in a similar manner, or may alternatively be cast having a non-cylindrical curvature, as described above with respect to FIG. 3. In some embodiments, a third metal material 148 may be cast in the die 104 without rotation or with a relatively small rotational velocity, such that the third metal material 148 fills a bottom portion of the die 104. In further embodiments, a fourth metal material 150 may be cast over the third metal material 148. Metal materials may be cast as desired until the roller cone 140 has a desired shape. The metal materials 142, 144, 148, 150 may be selected for various physical and/or chemical properties. In some embodiments, the first metal material 142 may have the same composition as the third metal material 148, and the second metal material 144 may have the same composition as the fourth metal material 150. The partially formed roller cone 140 may be subsequently machined, as described above.

In some embodiments, components of earth-boring tools (e.g., bit bodies, roller cones, blades, shanks, etc.) may include hard materials. Hard materials (e.g., hardfacing) may be applied to earth-boring tools after forming the tools, such as in a die as shown in FIGS. 1 through 5. In some embodiments, hard material (e.g., wear-resistant inserts) may be placed within a die before casting metal materials in the die, such as by the methods described in U.S. Patent Application Publication No. 2011/0287238, published Nov. 24, 2011, and entitled "Methods of Forming at Least a Portion of Earth-Boring Tools, and Articles Formed by Such Methods," the entire disclosure of which is hereby incorporated by reference.

In some embodiments, components of earth-boring tools (e.g., bit bodies, roller cones, blades, etc.) may include separately formed cutting elements, such as polycrystalline diamond compact (PDC) cutting elements. Cutting elements may be secured to earth-boring tools after forming the tools, such as by brazing, welding, pressing, sintering, etc.

As previously mentioned, embodiments of methods of the present disclosure also may be used to fabricate bit bodies of fixed-cutter earth-boring rotary drill bits.

Figure 6:
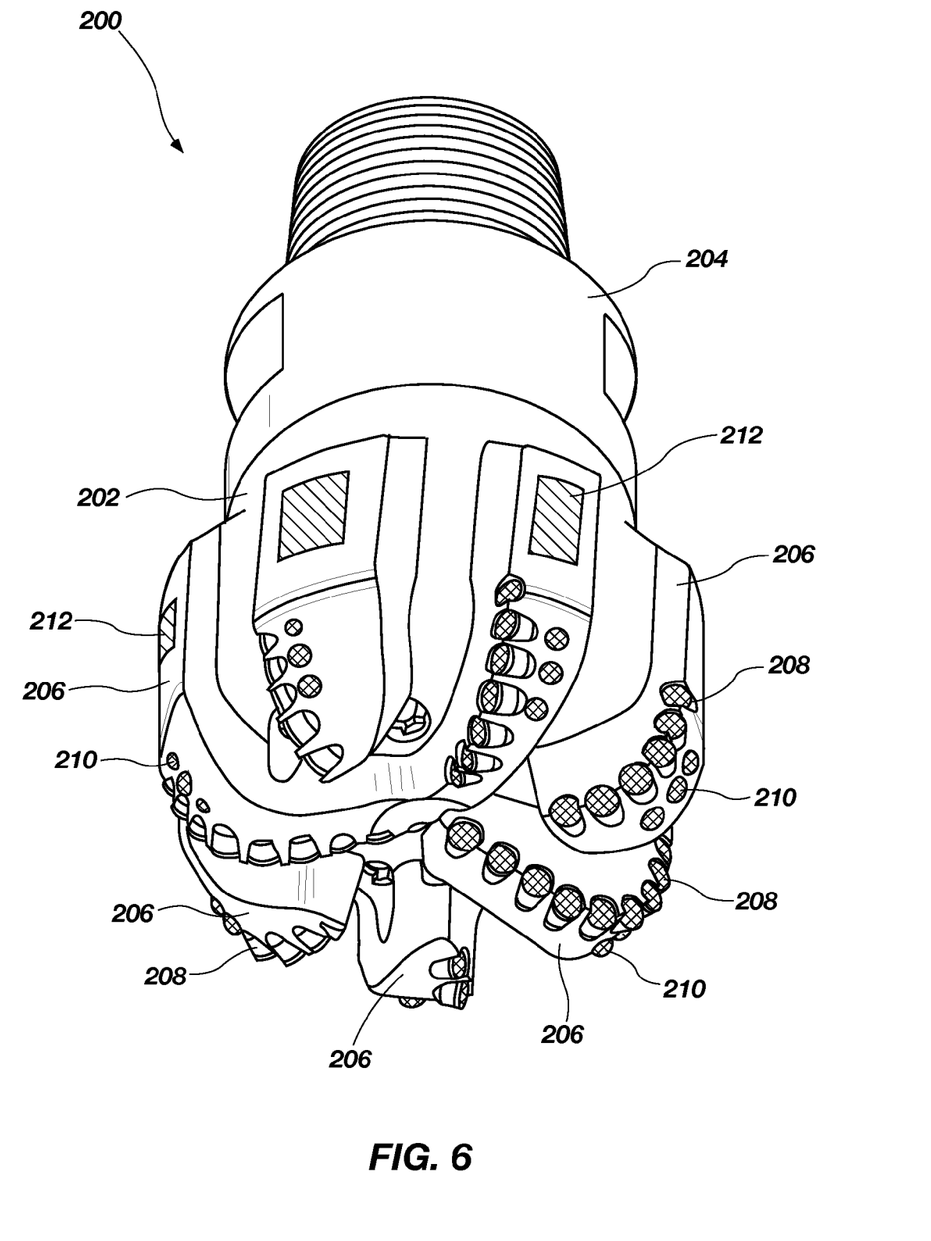
FIG. 6 is a simplified view of a fixed-cutter earth-boring drill bit.

The methods disclosed herein allow the fabrication of a unitary bit body that includes an integral shank sized and configured to be coupled to drill pipe. In some embodiments, the bit bodies may also include blades. The bit body may include steel or maraging steel, and one or more cutting elements may be disposed on the blades. For example, FIG. 6 shows a fixed-cutter earth-boring drill bit 200 having a unitary bit body 202 with an integral shank 204 and blades 206. The integral shank 204 may comprise, for example, a threaded pin conforming to industry standards set by the American Petroleum Institute (API). In some embodiments, the threads on the threaded pin may be formed using a machining process subsequent to the centrifugal casting process. The unitary bit body 202 may include one or more centrifugally cast materials, such as those described above with respect to FIGS. 1 through 5. The blades 206 each carry cutting elements 208 (e.g., PDC cutting elements). Cutting elements 208 may be configured to engage and remove material of the subterranean formation when the drill bit 200 is in operation. As shown in FIG. 6, the blades 206 may also carry one or more inserts 210, such as wear plugs or wear knots. Inserts 210 may be formed of a wear-resistant material, such as polycrystalline diamond, cubic boron nitride, tungsten carbide, etc. Inserts 210 may be configured to slide along a subterranean surface when the drill bit 200 is in operation.

Hardfacing material 212 may be affixed to one or more surfaces of the drill bit 200, such as by thermal spraying, welding, etc. Hardfacing material 212 may be configured to improve erosion and/or corrosion resistance of a portion of the drill bit 200. The hardfacing material 212 is shown in FIG. 6 on the gage region of the blades 206, but may be disposed anywhere on the bit body 202.

Figure 7:
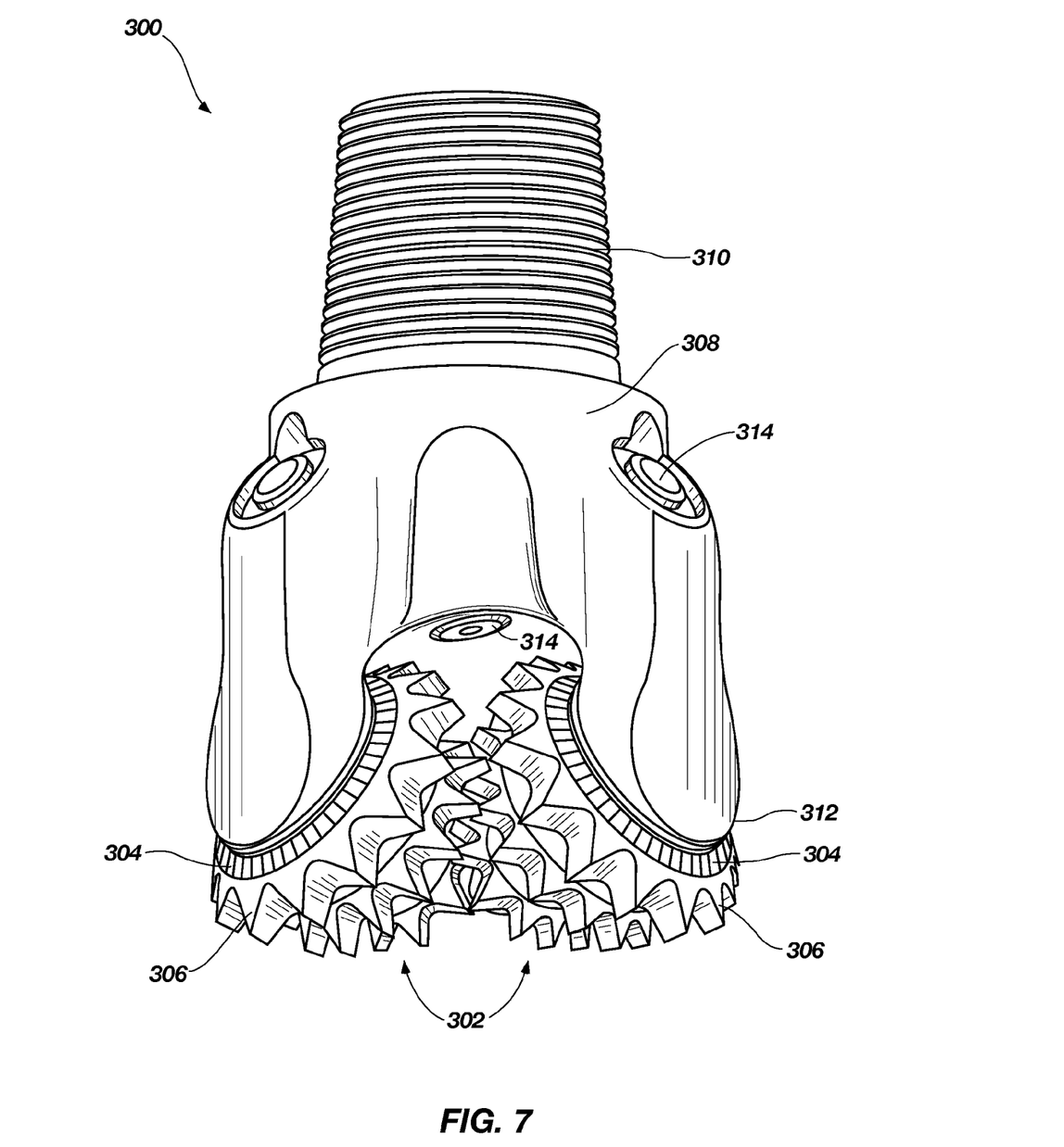
FIG. 7 is a simplified view of an earth-boring drill bit having roller cones.

FIG. 7 illustrates another earth-boring drill bit 300, which includes a plurality of cutter assemblies 302 each having a cone 304 that includes cutting teeth 306. As shown in FIG. 7, the earth-boring drill bit 300 has a bit body 308 with threads 310 formed on one end for connection to a drill string (not shown). The bit body 308 may have integrally formed bit legs 312, each supporting a cutter assembly 302. Additionally, the bit body 308 may have nozzles 314 for discharging drilling fluid into the borehole, which may be returned along with cuttings up to the surface during a drilling operation. In some embodiments, the bit body 308 and/or the cutter assemblies 302 may be formed of centrifugally cast material.

As shown in FIG. 7, each cutter assembly 302 may have a plurality of rows of cutting teeth 306. The cutting teeth 306 may vary in number, have a variety of shapes, and the number of rows of cutting teeth 306 may vary. Cutting teeth 306 may be integrally formed with the body of each cone 304, or may be formed separately and secured to each cone 304. The cutting teeth 306 are configured to contact a subterranean formation when the drill bit 300 is used in a drilling operation. The cutter assemblies 302 may include, for example, a roller cone 134, as described above and shown in FIG. 4. The cutter assemblies 302 may have one or more surfaces 136 (see FIG. 4), such as bearing surfaces, O-ring surfaces, etc. Such surfaces 136 may be formed or refined by machining.

In some embodiments, components of earth-boring tools (e.g., a bit body, a roller cone, a shank, etc.) may be formed of a maraging steel. Cutting elements may be disposed on the earth-boring tool, and the tool may be thermally aged.

The alloy may be substantially free of carbon (e.g., may contain carbon in concentrations well below the concentration of carbon in steel, such as than less than approximately 0.05 wt % carbon). The alloy may be a maraging steel, and may be formulated to form at least one intermetallic precipitate when aged. For example, the alloy may be aged by subjecting the alloy to a temperature of at least about 450° C. for at least about 1 hour, or at a temperature of from about 480° C. to about 500° C. for at least about 2 hours. The intermetallic precipitate may be a solid phase including two or more metallic elements (e.g., nickel and cobalt, nickel and molybdenum, etc.). Aging (i.e., heat treatment) of the alloy may change one or more physical properties of the alloy. For example, the aging process may increase the strength of a portion of the earth-boring tool.

In some embodiments, such alloys may be hot forged to form components of earth-boring tools. In other embodiments, an alloy may be cast in a die, such as a die 104 described above and shown in FIGS. 1 though 3 and 5. The alloy may be cast by pouring molten material into the die, by heating a solid material within the die, etc. The alloy may be cooled in the die while the die is rotating. Alternatively, the alloy may be cooled in a die that is not rotating, such as a static die. After the alloy has cooled, the alloy may be removed from the die. In some embodiments, the die may be removed from the alloy, such as by breaking or dissolving a portion of the die.

After forming the alloy in a selected configuration, further operations may be performed as desired. For example, a hardfacing material may be applied to one or more surfaces, or a portion of the alloy may be machined. Cutting elements may be attached to the alloy or formed integral to the bit body (e.g., by machining a portion of the alloy). Such operations may be performed before aging the alloy. The aging process may be performed at a low enough temperature that the cutting elements do not experience noticeable thermal degradation. For example, PDC cutting elements may undergo graphitization at about 750° C. Aging such cutting elements at, for example 500° C. or less for a few hours may have minimal deleterious effect. To minimize the possibility of over-aging through austenite reversion, ultrasonic brazing, resistive brazing, and/or diffusion brazing may be used to secure cutting elements to the bit body. For example, ultrasonic brazing is described in U.S. Provisional Patent Application No. 61/535,627, filed Sep. 16, 2011, and entitled "Methods for Attaching Cutting Elements to Earth-Boring Tools and Resulting Products," which is incorporated herein in its entirety by this reference.

Earth-boring tools as described herein may be easier to repair than conventional tools. For example, when a portion of a conventional earth-boring tool is repaired, there may be fatigue damage due to a dislocation of material (e.g., as new material is added to the tool). Detrimental effects of dislocations (e.g., slip bands, cracks, etc.) may be minimized or eliminated by subsequent annealing and/or aging, which may reform the crystal structure near the dislocation.

Bit bodies as shown and described herein may exhibit higher toughness (i.e., a greater ability to absorb energy before fracturing) than conventional metal-matrix composite bit bodies. Higher toughness may be due, in part to a higher yield strength of the material forming the bit bodies. Such materials may improve the performance and/or service life of drill bits because the bits may be less prone to breakage in service. Bits may be designed having slimmer blades and larger junk slots, yet may have blades with the same toughness as thicker blades formed by conventional techniques. Thus, bit designs may be revised for improved hydraulic performance based on improved physical properties of the body material.

Furthermore, manufacturing of integral bodies may be simpler than manufacturing of conventional tools. For example, eliminating the assembly of parts may eliminate the possibility of a mismatch between surfaces of the parts. Reproducibility and dimensional precision may be improved by limiting the number and type of individual parts and by forming parts of materials that experience little dimensional change during processing.

Additional non-limiting example embodiments of the disclosure are described below.

Embodiment 1

A method of forming an earth-boring tool, comprising introducing a first metal into a die configured to define at least a portion of an earth-boring tool, rotating the die while the first metal is in a molten state within the die to generate centrifugal forces on the molten first metal within the die, and cooling the first metal in the die while the die is rotating and solidifying the first metal from the molten state to form at least a portion of the earth-boring tool.

Embodiment 2

The method of Embodiment 1, wherein introducing the first metal into the die comprises pouring the first metal into the die in the molten state.

Embodiment 3

The method of Embodiment 2, wherein pouring the first metal into the die comprises pouring the first metal into the die while the die is rotating

Embodiment 4

The method of any of Embodiments 1 through 3, wherein the first metal comprises a maraging steel alloy.

Embodiment 5

The method of Embodiment 4, wherein the maraging steel alloy comprises iron and nickel and is substantially free of carbon.

Embodiment 6

The method of Embodiment 4, wherein the maraging steel comprises at least one of cobalt, molybdenum, and titanium.

Embodiment 7

The method of any of Embodiments 1 through 6, further comprising machining the first metal after cooling the first metal in the die while the die is rotating and solidifying the first metal from the molten state.

Embodiment 8

The method of any of Embodiments 1 through 7, further comprising forming a hardfacing material over at least a portion of the first metal after cooling the first metal in the die while the die is rotating and solidifying the first metal from the molten state.

Embodiment 9

The method of any of Embodiments 1 through 8, further comprising introducing a second metal into the die adjacent the first metal.

Embodiment 10

The method of Embodiment 9, wherein introducing the second metal into the die adjacent the first metal comprises rotating the die while the second metal is in a molten state within the die to generate centrifugal forces on the molten second metal within the die, cooling the second metal in the die while the die is rotating, and solidifying the second metal from the molten state to fuse the second metal to the first metal and form an inner portion of the earth-boring tool from the second metal.

Embodiment 11

The method of any of Embodiments 1 through 10, wherein rotating the die comprises rotating the die about a vertical axis.

Embodiment 12

The method of any of Embodiments 1 through 10, wherein rotating the die comprises rotating the die about a horizontal axis.

Embodiment 13

The method of any of Embodiments 1 through 12, further comprising forming the die to comprise at least one of metal and graphite.

Embodiment 14

The method of any of Embodiments 1 through 13, further comprising forming the die to define at least a portion of a bit body of a rotary drill bit.

Embodiment 15

The method of Embodiment 14, further comprising forming the die to define at least a portion of a shank to be integrally formed with the bit body of the rotary drill bit.

Embodiment 16

The method of any of Embodiments 1 through 13, further comprising forming the die to define at least a portion of a roller cone.

Embodiment 17

A rotary drill bit, comprising a unitary, centrifugally cast bit body including an integral shank and at least one blade, and at least one cutting element disposed on the at least one blade.

Embodiment 18

The rotary drill bit of Embodiment 17, wherein the at least one cutting element comprises at least one polycrystalline diamond compact cutting element secured to the at least one blade.

Embodiment 19

The rotary drill bit of Embodiment 17 or Embodiment 18, further comprising a hardfacing material over at least a portion of the unitary, centrifugally cast bit body.

Embodiment 20

The rotary drill bit of any of Embodiments 17 through 19, wherein the unitary, centrifugally cast bit body comprises a maraging steel alloy.

Embodiment 21

A rotary drill bit, comprising a bit body comprising a first centrifugally cast material and a second centrifugally cast material. The bit body comprises a shank and at least one blade. At least one cutting element is disposed on the at least one blade.

Embodiment 22

The rotary drill bit of Embodiment 21, wherein the first centrifugally cast material has a higher hardness than the second centrifugally cast material.

Embodiment 23

The rotary drill bit of Embodiment 21 or Embodiment 22, wherein the second centrifugally cast material has a higher yield strength than the first centrifugally cast material.

Embodiment 24

The rotary drill bit of any of Embodiments 21 through 23, wherein the bit body further comprises a third centrifugally cast material.

Embodiment 25

The rotary drill bit of any of Embodiments 21 through 24, wherein an inner surface of the first centrifugally cast material is adjacent an outer surface of the second centrifugally cast material.

Embodiment 26

A roller cone, comprising a body comprising a first centrifugally cast material and a second centrifugally cast material and at least one cutting element disposed on the body.

Embodiment 27

The roller cone of Embodiment 26, wherein at least a portion of a surface of the first centrifugally cast material is configured to contact a subterranean formation when the roller cone is disposed on a drill string.

Embodiment 28

The roller cone of Embodiment 26 or Embodiment 27, wherein a surface of the second centrifugally cast material defines a bearing surface.

Embodiment 29

A rotary drill bit, comprising a bit body and at least one cutting element disposed on the bit body. The bit body comprises a maraging steel alloy including iron, nickel, and an intermetallic precipitate phase.

Embodiment 30

The rotary drill bit of Embodiment 29, wherein the maraging steel alloy comprises from about 15 wt % to about 20 wt % nickel, from about 5 wt % to about 20 wt % cobalt, from about 2 wt % to about 6 wt % molybdenum, and from about 0.1 wt % to about 2.0 wt % titanium.

Embodiment 31

The rotary drill bit of Embodiment 29 or Embodiment 30, wherein the maraging steel alloy is substantially free of carbon.

Embodiment 32

The rotary drill bit of any of Embodiments 29 through 31, wherein the at least one cutting element comprises at least one polycrystalline diamond compact cutting element secured to the bit body.

Embodiment 33

A method of forming a rotary drill bit, comprising forming at least a portion of a rotary drill bit comprising a maraging steel alloy including iron, nickel, and at least one of cobalt, molybdenum, and titanium; disposing a plurality of cutting elements on the rotary drill bit; and aging the at least a portion of the rotary drill bit at a temperature of at least 450° C. to form at least one intermetallic precipitate phase in the at least a portion of the rotary drill bit.

Embodiment 34

The method of Embodiment 33, wherein forming at least a portion of the rotary drill bit comprises hot forging the maraging steel alloy.

Embodiment 35

The method of Embodiment 33 or Embodiment 34, wherein forming at least a portion of the rotary drill bit comprises casting the maraging steel alloy.

Embodiment 36

The method of Embodiment 35, wherein casting the maraging steel alloy comprises cooling the maraging steel alloy to solidify the maraging steel alloy from a molten state in a rotating die to form the at least a portion of the rotary drill bit.

Embodiment 37

The method of Embodiment 35 or Embodiment 36, wherein casting the maraging steel alloy comprises pouring the maraging steel alloy into a die in a molten state.

Embodiment 38

The method of Embodiment 37, further comprising cooling the maraging steel alloy in the die to solidify the maraging steel alloy from a molten state, and removing the cooled maraging steel alloy from the die.

Embodiment 39

The method of any of Embodiments 33 through 38, wherein forming at least a portion of the rotary drill bit comprises forming the maraging steel alloy to be substantially free of carbon.

Embodiment 40

The method of any of Embodiments 33 through 39, wherein aging the at least a portion of the rotary drill bit at a temperature of at least 450° C. comprises increasing a strength of the at least a portion of the rotary drill bit.

Embodiment 41

The method of any of Embodiments 33 through 40, further comprising applying a hardfacing material to at least one surface of the rotary drill bit.

Embodiment 42

The method of any of Embodiments 33 through 41, further comprising machining at least a portion of the rotary drill bit before disposing the plurality of cutting elements on the rotary drill bit.

Embodiment 43

The method of any of Embodiments 33 through 42, wherein forming at least a portion of a rotary drill bit comprises forming at least one of a fixed-cutter bit body and a roller cone.

Embodiment 44

The method of any of Embodiments 33 through 43, wherein disposing a plurality of cutting elements on the rotary drill bit comprises securing a plurality of separately formed cutting elements to the rotary drill bit.

Embodiment 45

The method of any of Embodiments 33 through 44, wherein disposing a plurality of cutting elements on the rotary drill bit comprises disposing a plurality of cutting elements on the rotary drill bit before aging the at least a portion of the rotary drill bit.

Embodiment 46

The method of any of Embodiments 33 through 44, wherein disposing a plurality of cutting elements on the rotary drill bit comprises disposing a plurality of cutting elements on the rotary drill bit after aging the at least a portion of the rotary drill bit.

Embodiment 47

A method of repairing a rotary drill bit, comprising annealing at least a portion of a rotary drill bit comprising a maraging steel alloy including iron, nickel, and at least one of cobalt, molybdenum, and titanium; and aging the at least a portion of a rotary drill bit at a temperature of at least 450° C. to form at least one intermetallic precipitate phase in the at least a portion of the rotary drill bit.

Embodiment 48

The method of Embodiment 47, further comprising decreasing fatigue damage in the at least a portion of the rotary drill bit.

While the present disclosure has been described with respect to certain embodiments, those of ordinary skill in the art will recognize and appreciate that it is not so limited. Rather, many additions, deletions and modifications to the embodiments described herein may be made without departing from the scope of the invention as hereinafter claimed, including legal equivalents. In addition, features of one embodiment may be combined with features of another embodiment while still being encompassed within the scope of the invention as contemplated by the inventors. Further, embodiments of the disclosure have utility with different and various bit profiles as well as cutting element types and configurations.

What is claimed is:

1. A method of forming an earth-boring tool, comprising:
   introducing a first metal into a die configured to define at least a portion of at least one cutting element of an earth-boring tool, the die comprising at least one sidewall and a closed end;
   rotating the die about an axis of rotation while the first metal is in a molten state within the die to generate centrifugal forces on the molten first metal and form a surface of the molten first metal over the at least one sidewall and the closed end of the die, wherein the surface of the molten first metal over the at least one sidewall at least substantially covers the closed end of the die and intersects the axis of rotation;
   cooling the first metal in the die while the die is rotating and solidifying the first metal from the molten state to form at least a portion of the at least one cutting element of the earth-boring tool, the at least one cutting element having a surface intersecting the axis of rotation;
   introducing a second metal into the die adjacent the first metal, the second metal having a composition different from a composition of the first metal;
   rotating the die about the axis of rotation while the second metal is in a molten state within the die to generate centrifugal forces on the molten second metal and form a surface of the molten second metal over the at least one sidewall and the closed end of the die and intersecting the axis of rotation;
   cooling the second metal in the die while the die is rotating and solidifying the second metal from the molten state to fuse the second metal to the first metal and form an inner portion of the earth-boring tool from the second metal; and
   machining the second metal after cooling and solidifying the second metal.

2. The method of claim 1, wherein introducing the first metal into the die comprises pouring the first metal into the die in the molten state.

3. The method of claim 2, wherein pouring the first metal into the die comprises pouring the first metal into the die while the die is rotating.

4. The method of claim 1, wherein the first metal comprises a maraging steel alloy.

5. The method of claim 4, wherein the maraging steel alloy comprises iron and nickel and is substantially free of carbon.

6. The method of claim 4, wherein the maraging steel alloy comprises at least one of cobalt, molybdenum, and titanium.

7. The method of claim 1, further comprising forming a hardfacing material over at least a portion of the first metal after cooling the first metal.

8. The method of claim 1, wherein rotating the die about the axis of rotation comprises rotating the die about a vertical axis.

9. The method of claim 1, wherein rotating the die about the axis of rotation comprises rotating the die about a horizontal axis.

10. The method of claim 1, further comprising forming the die to comprise at least one of metal and graphite.

11. The method of claim 1, further comprising forming the die to define at least a portion of a bit body of a rotary drill bit.

12. The method of claim 11, further comprising forming the die to define at least a portion of a shank to be integrally formed with the bit body of the rotary drill bit.

13. The method of claim 1, further comprising forming the die to define at least a portion of a roller cone.

14. The method of claim 1, wherein rotating the die about an axis of rotation while the first metal is in a molten state within the die comprises forming the surface of the molten first metal to be higher adjacent a surface of the die than at the axis of rotation.

15. The method of claim 1, wherein rotating the die about an axis of rotation while the first metal is in a molten state within the die comprises forming a parabolic surface of the molten first metal.

16. The method of claim 1, wherein rotating the die about an axis of rotation while the first metal is in a molten state within the die comprises forming the surface of the molten first metal normal to the axis of rotation.

17. The method of claim 1, wherein rotating the die about an axis of rotation while the first metal is in a molten state within the die comprises forming a non-cylindrical surface of the molten first metal.

18. The method of claim 1, wherein:
rotating the die while the first metal is in a molten state within the die comprises rotating the die at a first rotational velocity; and
rotating the die while the second metal is in a molten state within the die comprises rotating the die at a second rotational velocity different from the first rotational velocity.

* * * * *